United States Patent
Takaku et al.

(10) Patent No.: US 8,706,945 B2
(45) Date of Patent: Apr. 22, 2014

(54) MEMORY CONTROL DEVICE

(75) Inventors: Kazuya Takaku, Kawasaki (JP);
Yasufumi Honda, Kawasaki (JP); Kenji Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1080 days.

(21) Appl. No.: 11/790,267

(22) Filed: Apr. 24, 2007

(65) Prior Publication Data
US 2008/0046631 A1 Feb. 21, 2008

(30) Foreign Application Priority Data

Aug. 18, 2006 (JP) ................................ 2006-223567

(51) Int. Cl.
*G06F 12/00* (2006.01)
*G06F 13/00* (2006.01)
*G06F 13/28* (2006.01)

(52) U.S. Cl.
USPC ................................................. 711/2; 711/5

(58) Field of Classification Search
USPC ......................................................... 711/2, 5
See application file for complete search history.

(56) References Cited

U.S. PATENT DOCUMENTS

| | | | |
|---|---|---|---|
| 4,761,736 A * | 8/1988 | Di Orio | ............................. 711/2 |
| 5,321,697 A | 6/1994 | Fromm et al. | |
| 5,848,247 A | 12/1998 | Matsui et al. | |
| 6,049,844 A | 4/2000 | Matsui et al. | |
| 6,108,745 A | 8/2000 | Gupta et al. | |
| 6,226,757 B1 * | 5/2001 | Ware et al. | ..................... 713/503 |
| 6,272,594 B1 | 8/2001 | Gupta et al. | |
| 6,286,118 B1 * | 9/2001 | Churchill et al. | ............. 714/726 |
| 6,535,450 B1 * | 3/2003 | Ryan et al. | ................ 365/230.03 |
| 6,594,720 B1 | 7/2003 | Matsui et al. | |
| 6,792,493 B2 | 9/2004 | Matsui et al. | |
| 6,834,018 B2 | 12/2004 | Okazawa et al. | |
| 7,149,841 B2 * | 12/2006 | LaBerge | ........................... 711/5 |
| 7,319,619 B1 * | 1/2008 | Choe | ......................... 365/189.05 |
| 7,433,992 B2 | 10/2008 | Bains | |
| 7,673,094 B2 * | 3/2010 | LaBerge | ........................... 711/5 |
| 7,840,744 B2 * | 11/2010 | Bellows et al. | ................... 711/5 |
| 8,006,057 B2 * | 8/2011 | LaBerge | ....................... 711/167 |

(Continued)

FOREIGN PATENT DOCUMENTS

| | | |
|---|---|---|
| JP | 7-507410 | 8/1995 |
| JP | 8-95943 A | 4/1996 |

(Continued)

OTHER PUBLICATIONS

Japanese Office Action mailed Nov. 22, 2011 for corresponding Japanese Application No. 2006-223567, with English-language Translation.

(Continued)

*Primary Examiner* — Sheng-Jen Tsai
(74) *Attorney, Agent, or Firm* — Fujitsu Patent Center

(57) ABSTRACT

To provide a technology of increasing the number of ranks of a memory module with a small change in architecture. A memory control device accessing a memory module having a plurality of ranks, includes an interface unit having selection signal lines via which to flow selection signals for selecting the ranks and address signal lines via which to flow address signals specifying addresses on the rank, and a control unit transmitting the signal for selecting the rank via part of the address signal line and via the selection signal line.

5 Claims, 17 Drawing Sheets

(56) References Cited

U.S. PATENT DOCUMENTS

| | | |
|---|---|---|
| 2001/0042174 A1 | 11/2001 | Gupta et al. |
| 2003/0086314 A1* | 5/2003 | Okazawa et al. ............. 365/200 |
| 2003/0105933 A1* | 6/2003 | Keskar et al. ................. 711/167 |
| 2003/0149821 A1 | 8/2003 | Matsui et al. |
| 2004/0168012 A1* | 8/2004 | Tsai ................................. 711/5 |
| 2004/0193777 A1* | 9/2004 | LaBerge ........................... 711/5 |
| 2005/0050414 A1* | 3/2005 | Whetsel ........................ 714/724 |
| 2005/0243627 A1* | 11/2005 | Lee et al. ...................... 365/222 |
| 2005/0268059 A1* | 12/2005 | LaBerge ....................... 711/167 |
| 2006/0107011 A1* | 5/2006 | Nystuen et al. .............. 711/167 |
| 2006/0117152 A1* | 6/2006 | Amidi et al. ................. 711/154 |
| 2006/0212761 A1* | 9/2006 | Levine et al. ................... 714/45 |
| 2006/0221748 A1* | 10/2006 | Kinsley et al. ................ 365/222 |
| 2007/0079049 A1* | 4/2007 | LaBerge ........................... 711/5 |
| 2008/0028127 A1* | 1/2008 | Ware et al. ................... 711/100 |
| 2010/0138598 A1* | 6/2010 | LaBerge ....................... 711/105 |
| 2012/0246544 A1* | 9/2012 | Resnick et al. .............. 714/764 |

FOREIGN PATENT DOCUMENTS

| | | |
|---|---|---|
| JP | 10-320270 A | 12/1998 |
| JP | 11-265315 | 9/1999 |
| JP | 2000-090005 | 3/2000 |
| JP | 2003-007963 | 1/2003 |
| JP | 2003-151261 A | 5/2003 |
| JP | 2003-345652 A | 12/2003 |
| JP | 2008-521158 A | 6/2008 |
| WO | WO-2006/055497 A2 | 5/2006 |

OTHER PUBLICATIONS

Japanese Office Action mailed Mar. 21, 2012 for corresponding Japanese Application No. 2006-223567, with English-language translation.

* cited by examiner

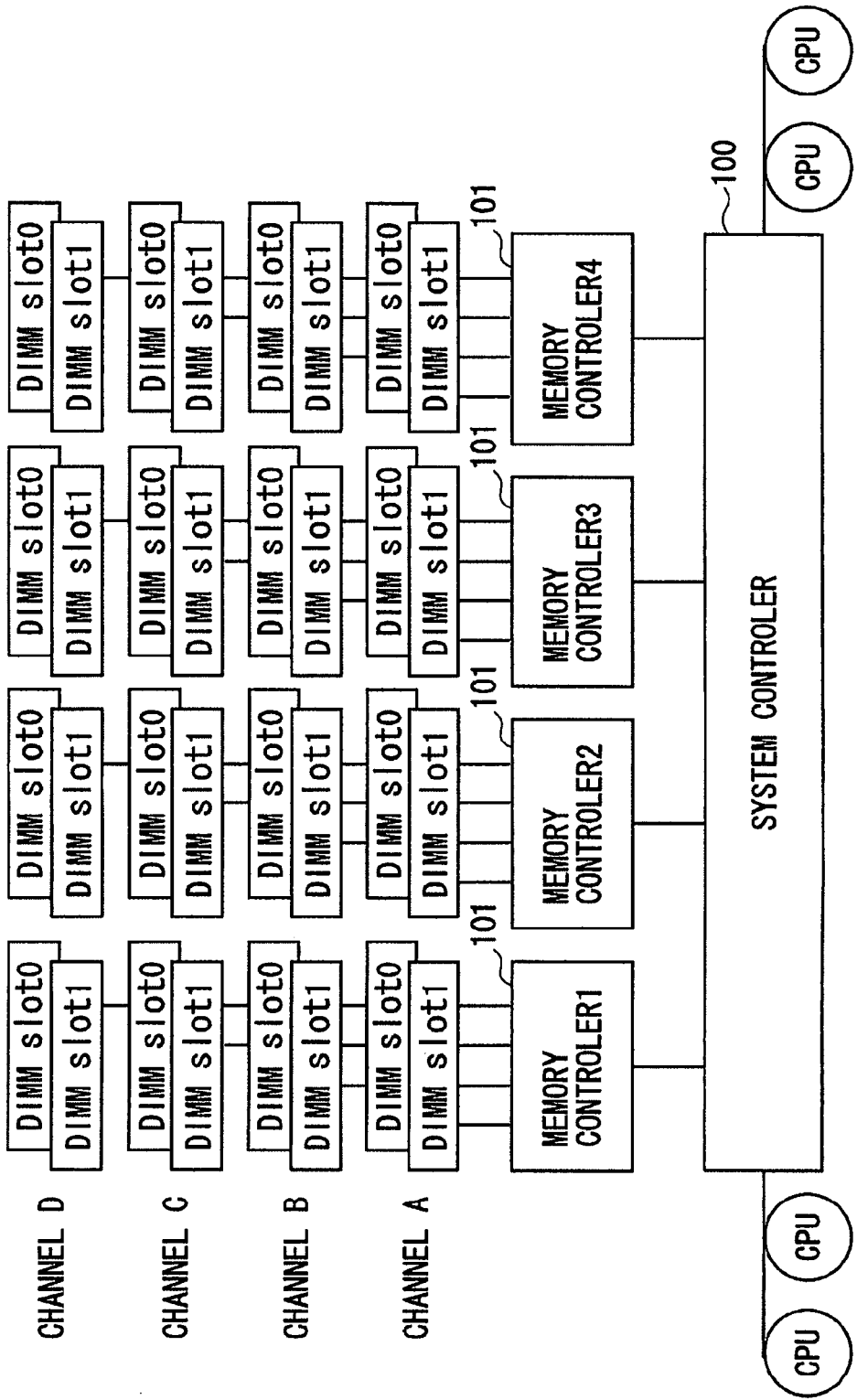

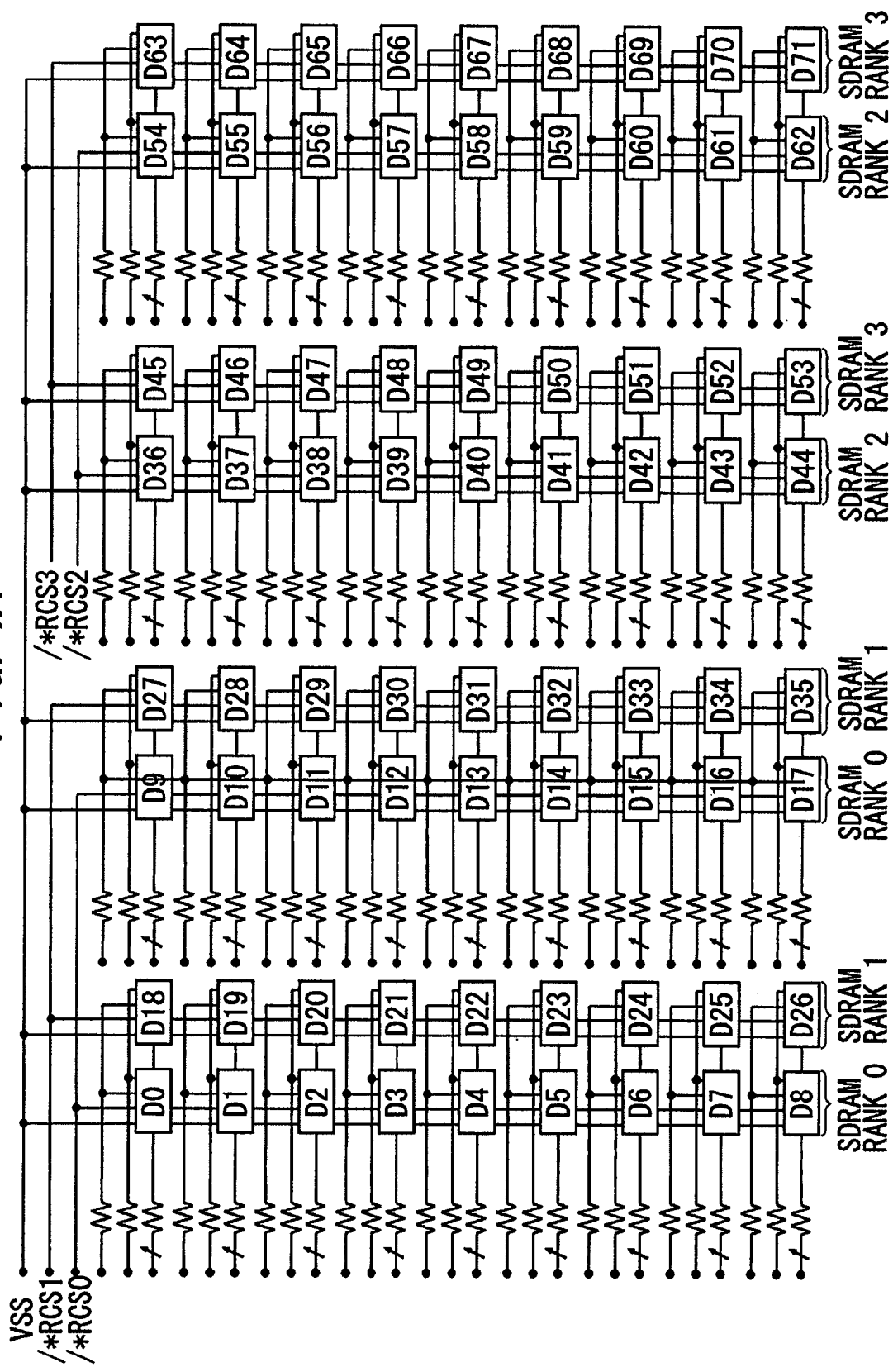

|  | A14 | CS1 | CS0 |
|---|---|---|---|
| RANK 0 | 0 | 0 | 1 |
| RANK 1 | 0 | 1 | 0 |
| RANK 2 | 1 | 0 | 1 |
| RANK 3 | 1 | 1 | 0 |

PALL: COMMAND EXECUTED BEFORE PRECHARGE ALL REFRESHING,
REF: REFRESHING,
tRAS: MINIMUM WAIT TIME FOR PRECHARGE ALL AND REFRESHING

MEMORY CONTROL DEVICE

BACKGROUND OF THE INVENTION

The present invention relates to a technology of actualizing a large-capacity memory module.

FIG. 1 illustrates an example of a configuration of a computer such as a server etc mounted with a byte-slice type memory controller.

CPUs and memory controllers 101 are connected to a system controller 100 that controls the device. At least one DIMM (Dual Inline Memory Module) is connected to each of the memory controllers 101, and a memory access is carried out in such a way that four pieces of memory controllers synchronize with each other (FIG. 1).

FIG. 2A-2C is a diagram of an outline of an architecture of the DIMM and shows an example of the 2-rank DIMM using a DDR2 (Double Data Rate 2) interface. The DIMM has eighteen pieces (18) of SDRAMs (Synchronous Dynamic Random Access Memories) at one rank, and therefore has totally thirty six (36) pieces of SDRAMs at two ranks as a whole of the DIMM.

In the DIMM having the plurality of ranks, the read and write from and to the respective ranks are selectively conducted by use of chip selection signals for the number of ranks (rank count). At the present, the DDR2 interface considered to be one of de facto standards has two chip selection signal lines and sixteen address signal lines A0-A15, wherein the rank count, in the case of adopting this interface, is "2" at the maximum, and a maximum readable/writable capacity using the sixteen address signal lines at 2 ranks is on the order of 16 GB.

Further, for instance, a technology disclosed in the following Patent document 1 is given as the prior art related to the invention of the present application.

[Patent document 1] Japanese Patent Application Laid-Open Publication No. 2003-7963

SUMMARY OF THE INVENTION (1) First Problem

In the conventional DDR2 interface, a controllable rank count is up to two ranks, and an increase in capacity of the memories mounted on a device involves taking nothing but a method of increasing the number of DIMM (Dual Inline Memory Module) access channels or a method of increasing a capacity of each of SDRAMS mounted on the DIMM.

An upper limit of the SDRAM capacity depends on a manufacturing technology, and hence the capacity can not be increased arbitrarily over the upper limit.

Moreover, the increase in rank count requires adding one chip selection signal line per rank, and a board must be redeveloped such as increasing the number of pins of a memory controller, which is not realistic.

(2) Second Problem

A known example [Japanese Patent Application Laid-Open No. 2002-184176] proposes a scheme of increasing the rank count from 2 ranks to 4 ranks, however, this scheme can not be applied to the high-speed interface such as the DDR2 interface. Moreover, in the case of increasing the rank count, the DIMM exemplified in the known example must be uncontrollable if not changed on the side of the memory controller, however, nothing about this control is disclosed, and such a problem arises that realizability thereof is poor.

For example, the increase in the number of ranks connotes a rise in the number of physical SDRAMs, which involves a necessity for a circuit for initialized the increased number of SDRAMs and a necessity for a memory refreshing circuit.

Such being the case, the present invention provides a technology of increasing the number of ranks of the memory module with a small change in architecture.

The present invention adopts the following configurations in order to solve the problems.

Namely, according to the present invention, a memory control device accessing a memory module having a plurality of ranks, comprises:

an interface unit including selection signal lines via which to flow selection signals for selecting the ranks and address signal lines via which to flow address signals specifying addresses on the selected rank; and a control unit transmitting the signal for selecting the rank via part of the address signal line and via the selection signal line.

Further, an information processing device according to the present invention comprises:

a memory module having a plurality of ranks;

a processor executing a process by use of information stored in the memory module; and a memory control device controlling an access to the memory module, wherein the memory control device includes:

an interface unit receiving connections of selection signal lines via which to flow selection signals for selecting the ranks of the memory module and of address signal lines via which to flow address signals specifying addresses on the selected rank; and a control unit transmitting a signal for selecting the rank from within the address signals and the selection signals.

The control unit may transmit a signal for selecting a larger number of ranks than the number of the selection signal lines.

The interface unit may be a DDR2 interface.

The memory control device may further comprise a memory refreshing control circuit executing memory refreshing processes corresponding to the number of ranks on the basis of a command given from the control unit.

The control unit may insert, if the accesses to said different ranks get consecutive, a predetermined period of standby time between the accesses.

The control unit may control each ODT (On Die Termination) provided in each of the ranks in accordance with the number of ranks of the memory module and/or a type of the access command.

Still further, a memory module comprises:

memory groups blocked into a plurality of ranks each connected in a selectively accessible manner;

an interface unit having selection signal lines via which to flow selection signals for selecting the ranks and address signal lines via which to flow address signals specifying addresses on the selected rank; and a decoding unit selecting the rank and getting the selected rank accessed on the basis of a signal obtained via the address signal line and the selection signal on the occasion of receiving an access command via the interface unit.

The memory module may further comprising a larger number of ranks than the number of selection signal lines.

In the memory module, the decoding unit may be disposed between registers

According to the present invention, it is possible to provide a technology of increasing the number of ranks of the memory module with the small change in architecture.

BRIEF DESCRIPTION OF THE DRAWINGS

FIG. 1 is a diagram of an outline of the elated technology.

FIG. 4A is a diagram showing a memory architecture in the present embodiment.

DETAILED DESCRIPTION OF THE PREFERRED EMBODIMENT

A best mode for carrying out the present invention will hereinafter be described with reference to the drawings. A Configuration in the following embodiment is an exemplification, and the present invention is not limited to the configuration in the embodiment.

§1. Whole Configuration

Figure 2A:
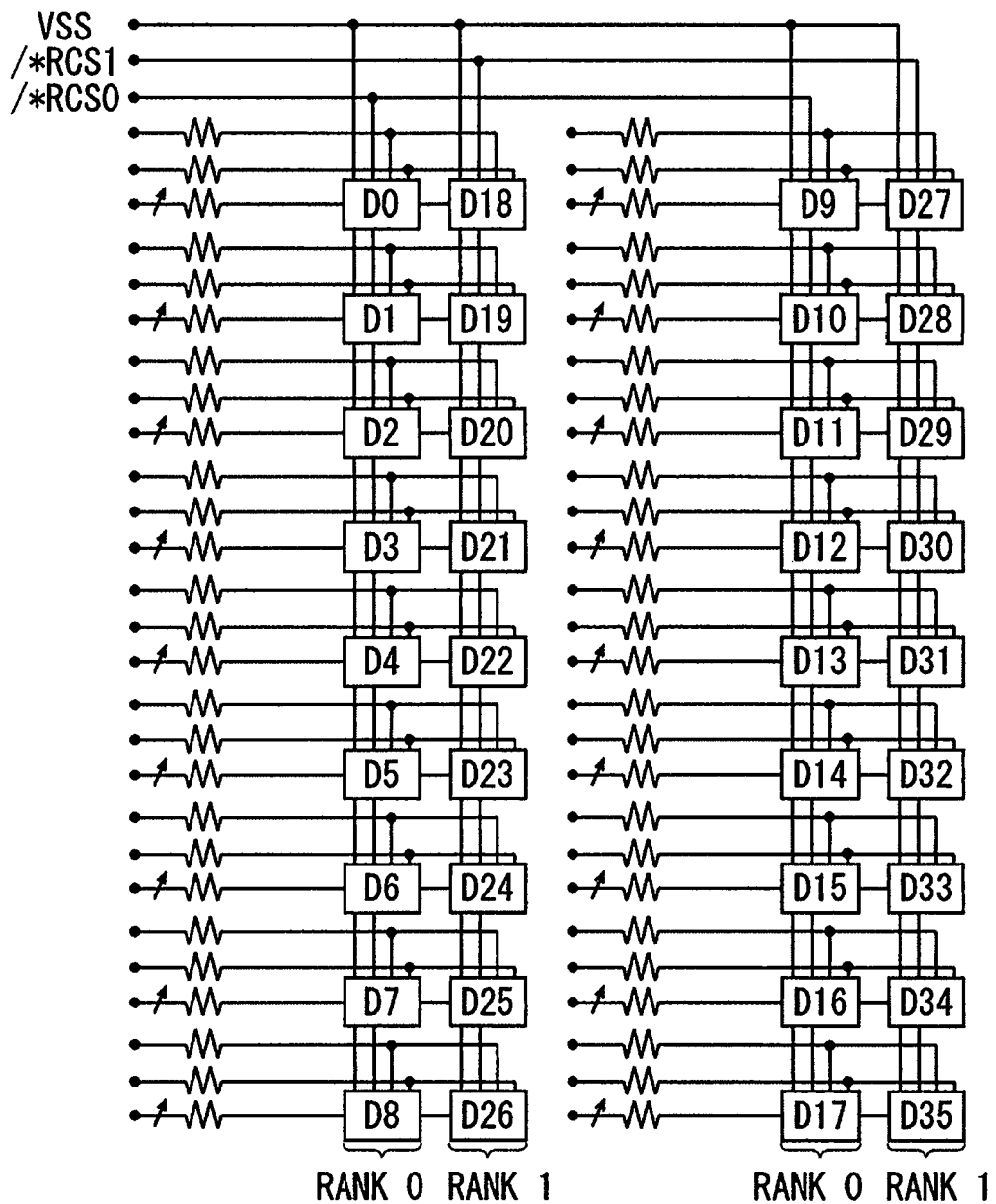
FIG. 2A is a diagram showing a memory architecture in the related technology.
Figure 2B:
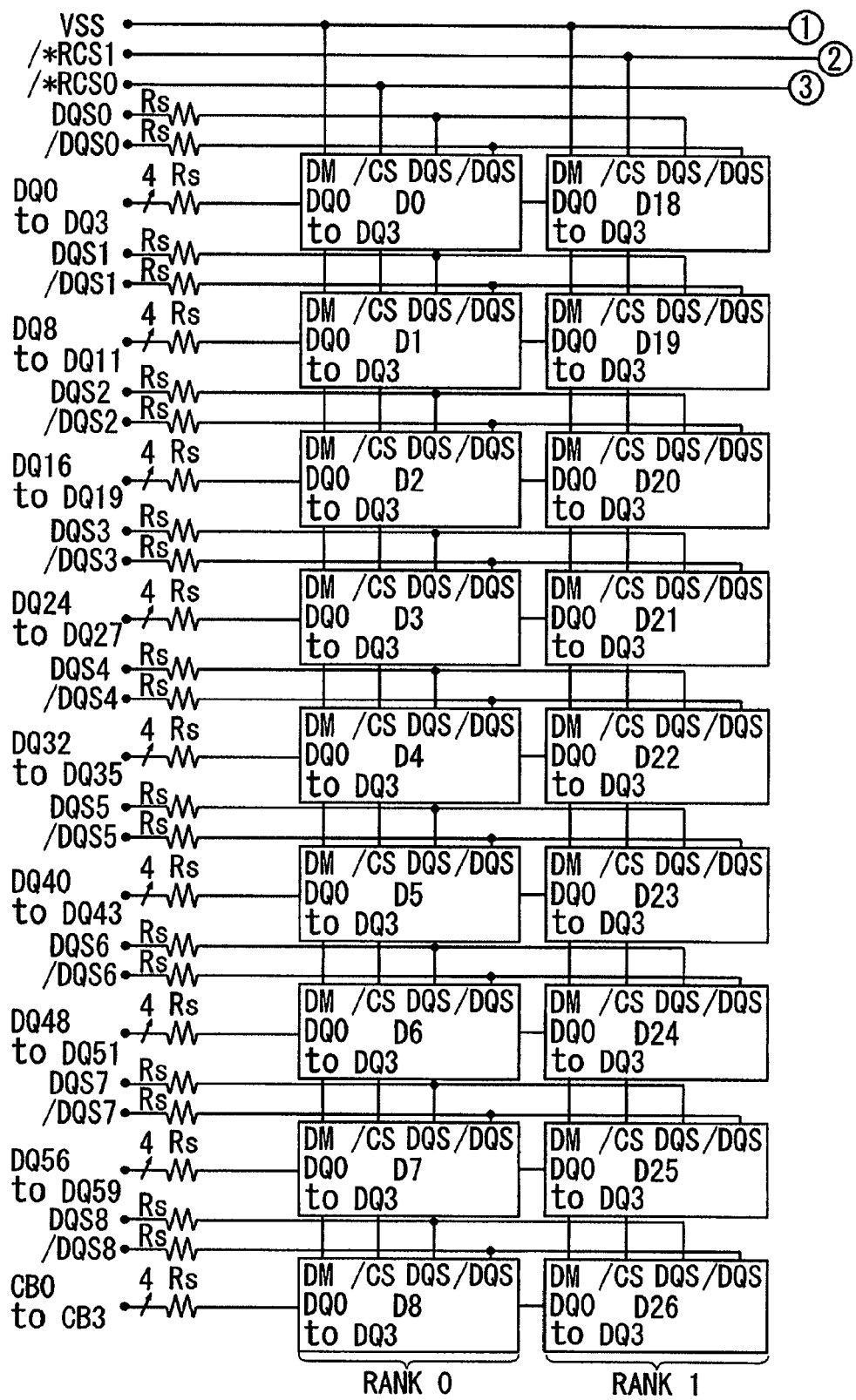
FIG. 2B is a detailed diagram showing SDRAMs D0-D8, D18-D26 in the FIG. 2A.
Figure 2C:
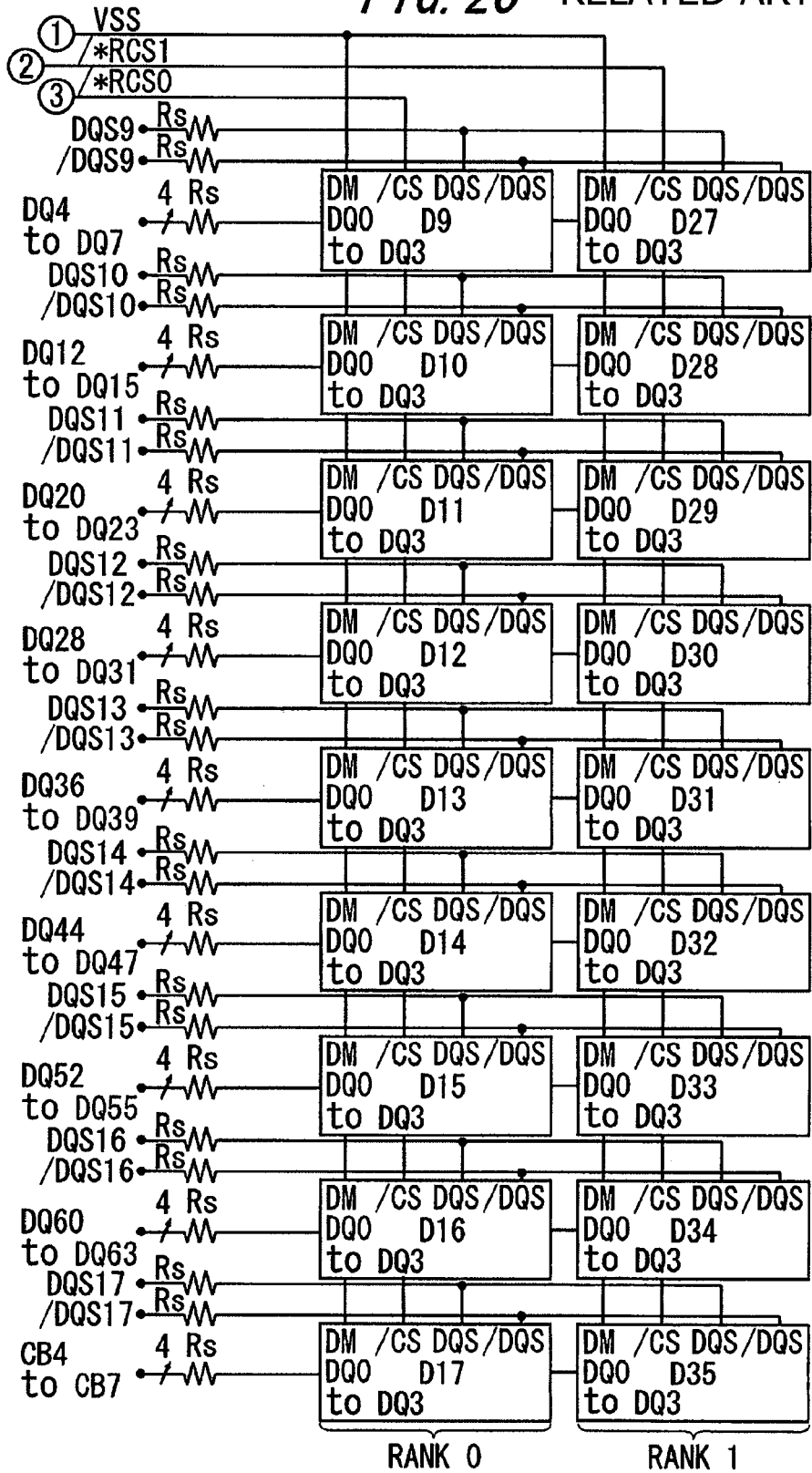
FIG. 2C is a detailed diagram showing SDRAMs D9-D17, D27-D35 in the FIG. 2A.
Figure 3:
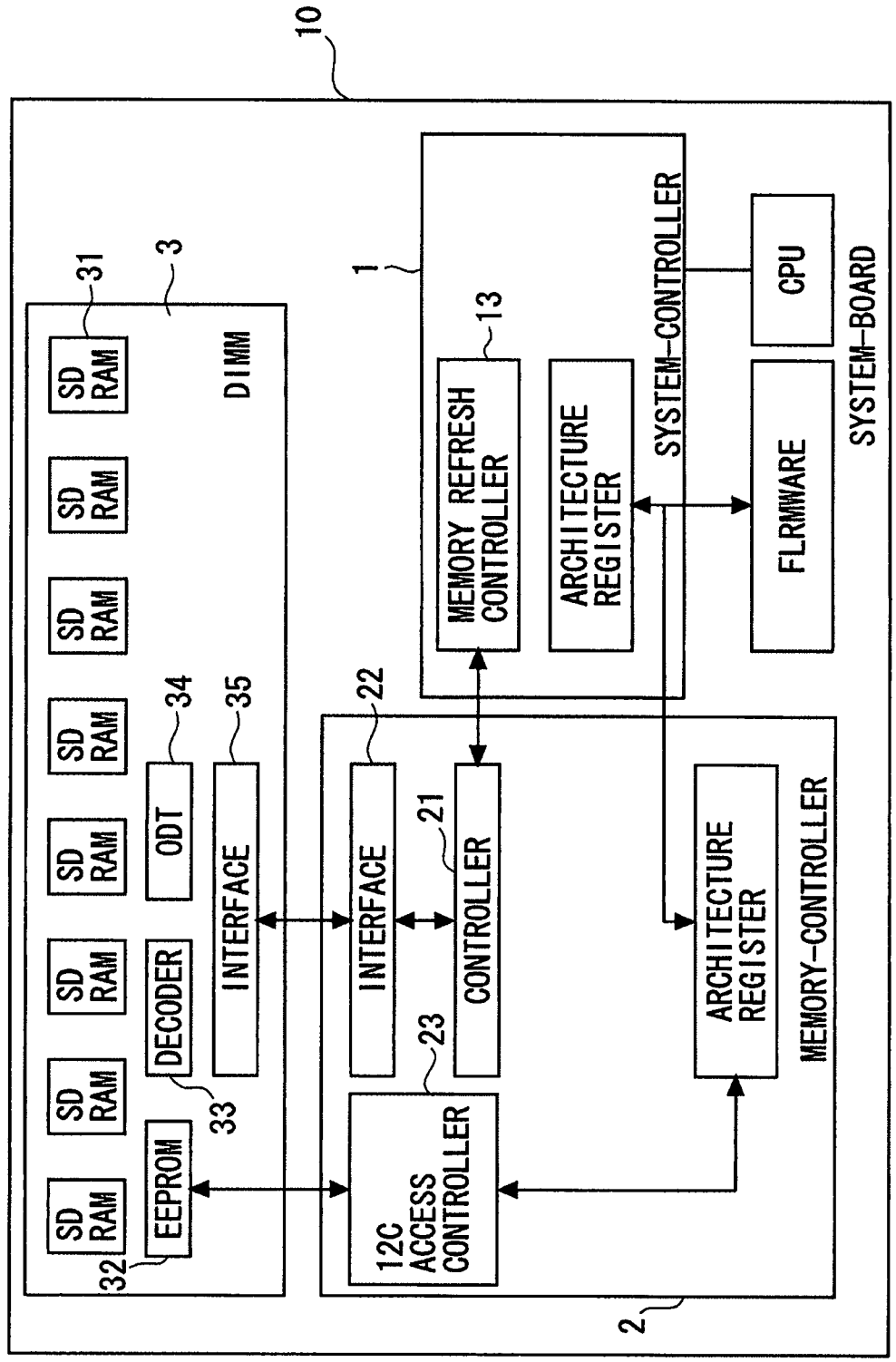
FIG. 3 is a diagram of a whole information processing device.
Figure 4B:
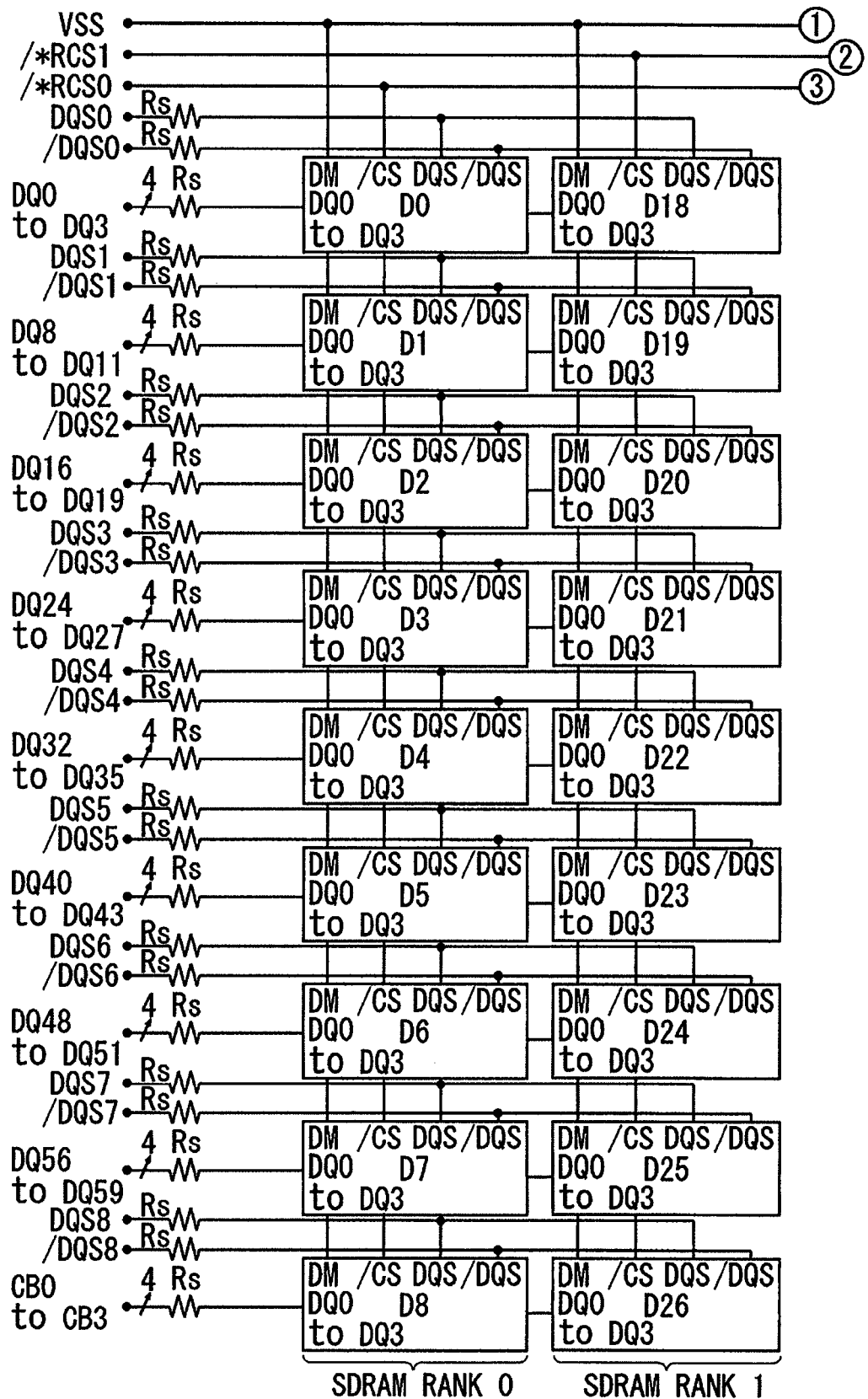
FIG. 4B is a detailed diagram showing SDRAMs D0-D8, D18-D26 in the FIG. 4A.
Figure 4C:
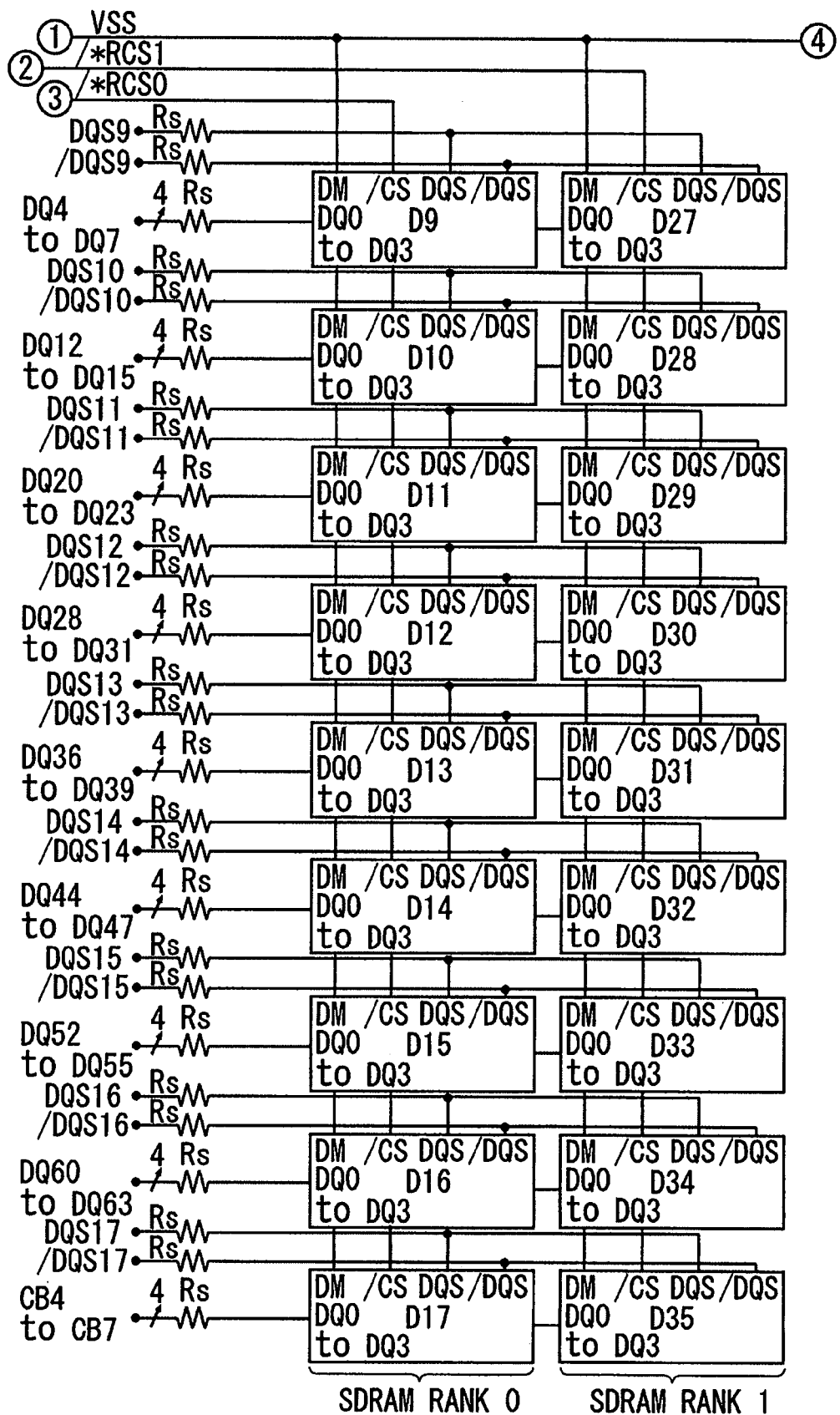
FIG. 4C is a detailed diagram showing SDRAMs D9-D17, D27-D35 in the FIG. 4A.
Figure 4D:
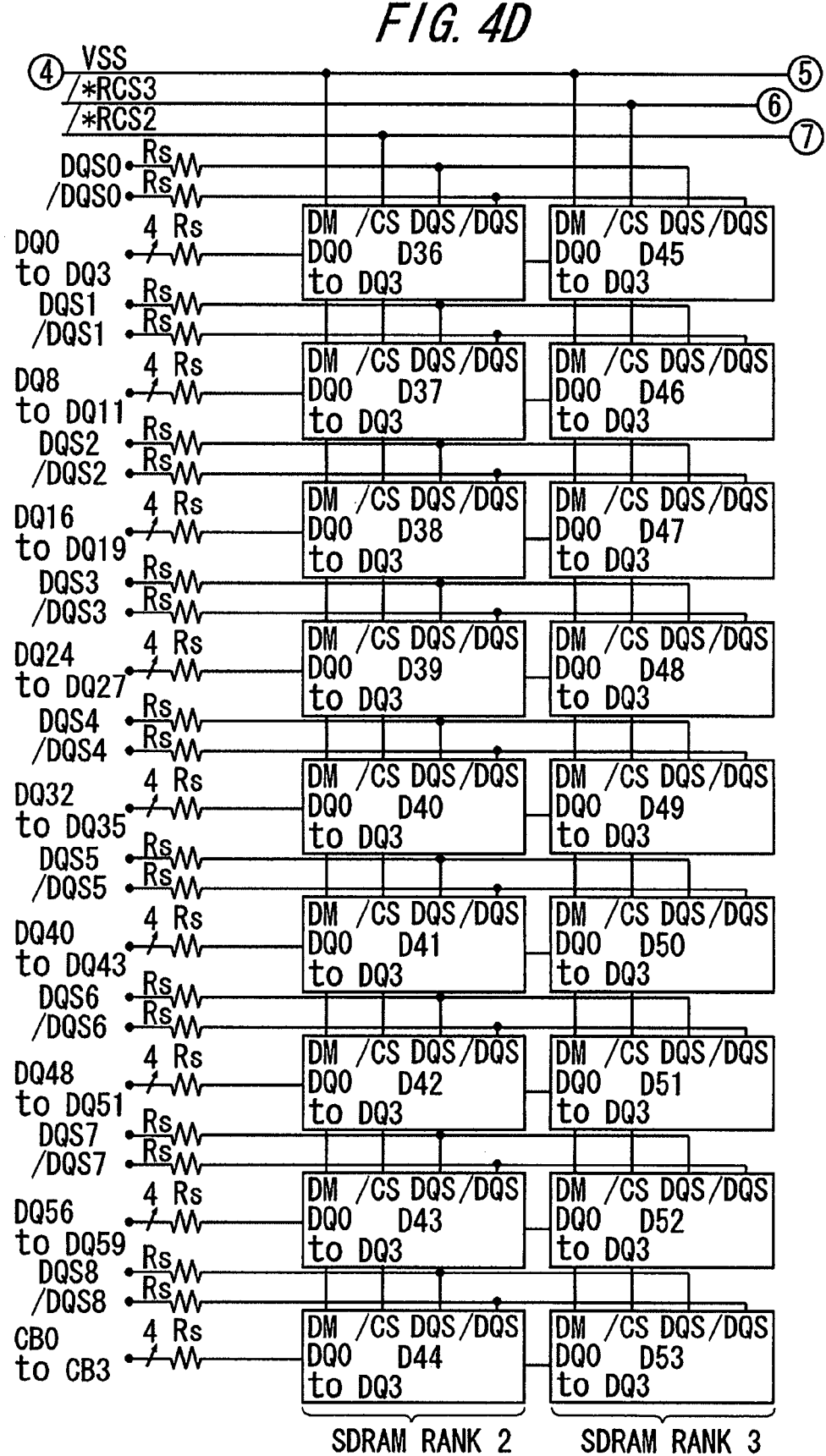
FIG. 4D is a detailed diagram showing SDRAMs D36-D44, D45-D53 in the FIG. 4A.
Figure 4E:
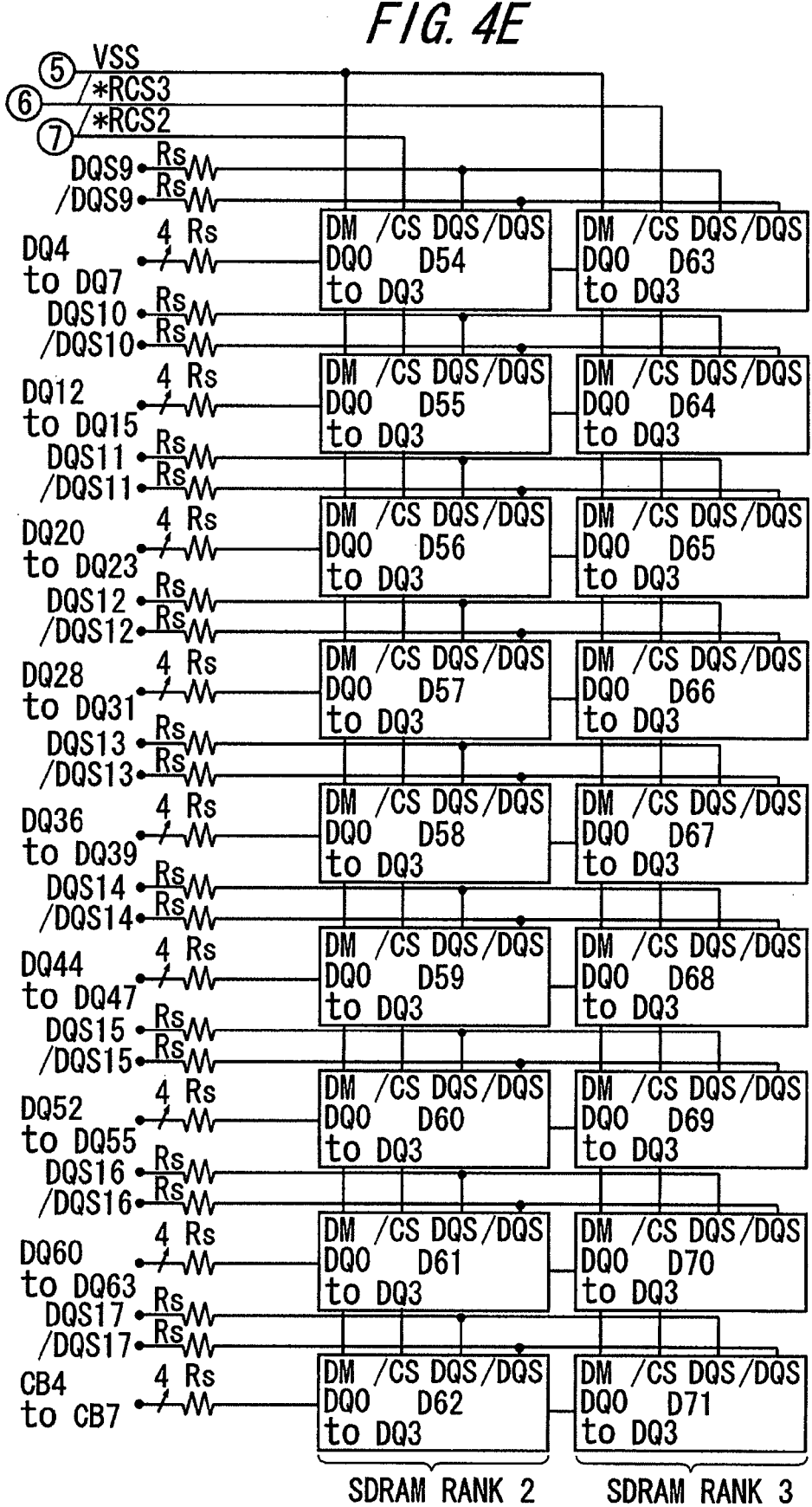
FIG. 4E is a detailed diagram showing SDRAMs D54-D62, D63-D71 in the FIG. 4A.

FIG. 3 is a diagram of an outline of an information processing system according to one embodiment of the present invention.

An information processing system 10 in the present example is a general-purpose computer including, on a system board, a CPU, a system controller 1, a memory controller 2 and a memory module 3.

The information processing system 10 may include a plurality of memory controllers 2 (memory control devices) 2 and a plurality of memory modules 3. For instance, in the same way as in FIG. 1, at least one DIMM is connected to each of the memory controllers 2, and the memory access is done while the four memory controllers synchronize with each other.

§2. Description of Each of Components

The memory module 3 in the present embodiment is, as illustrated in FIG. 4A-4E, the DIMM using the DDR2 interface, which will hereinafter be also termed DIMM 3. The DIMM 3 has eighteen pieces (18) of SDRAMs 31 for one rank (a block (group) of SDRAMs for input/output) and therefore has seventy two pieces (72) of SDRAMs 31 (memory group) for four ranks.

The DIMM 3 takes a memory architecture in which two SDRAM groups each having 1 GB correspond to one rank that has hitherto been adopted, and therefore has totally 8 GB capacity.

The DIMM 3 has, in addition to SDRAMs 31 as storage elements, an EEPROM 32, a decoder circuit (decoding unit) 33, an ODT (On Die Termination) 34 and an interface 35.

The EEPROM 32 is stored with specifications of registers for latching address signal lines etc in order to actualize fast transmission, PLLs (Phase Locked Loops) and the DIMMs.

The ODT 34 is a bus termination resistor mounted for the SDRAMs per rank and is ON/OFF-controlled by the memory controller 2.

The interface unit 35 is a DDR2 interface having selection signal lines via which to flow a selection signal for selecting the rank and address signal lines via which to flow an address signal for specifying an address on the selected rank.

The decoder circuit 33 generates, when receiving an access command via the interface unit 35, rank selection signals including added ranks 2 and 3 on the basis of the signals obtained via the address signal lines and the rank selection signals, thereby enabling the rank selection and also the access to be done.

The system controller 1 controls the CPU and each of the memory controllers 2. The system controller 1 controls the synchronization among the respective memory controllers 2 and give memory access commands to the respective memory controllers 2. Each of the memory controllers 2 accesses the memory according to the command given from the system controller 1.

The system controller 1 includes a memory refreshing control circuit 13.

The memory controller 2 has a control unit 21, an interface unit 22 and an EEPROM access control circuit 23.

The control unit 21 performs the access control for the DIMM 3 such as transmitting the rank selection signals via part of the address signal lines and via the selection signal lines.

The interface unit 22 is the DDR2 interface having the selection signal lines via which to flow the selection signal for selecting the rank and the address signal lines via which to flow the address signal for specifying the address on the selected rank.

Memory controller 2 corresponds to each memory controller 101 in FIG. 1, moves similarly, provided with four DIMM bus channels employing the DDR2 bus interface, wherein two pieces of DIMM slots are bus-connected to each of the DIMM bus channels.

Figure 5:
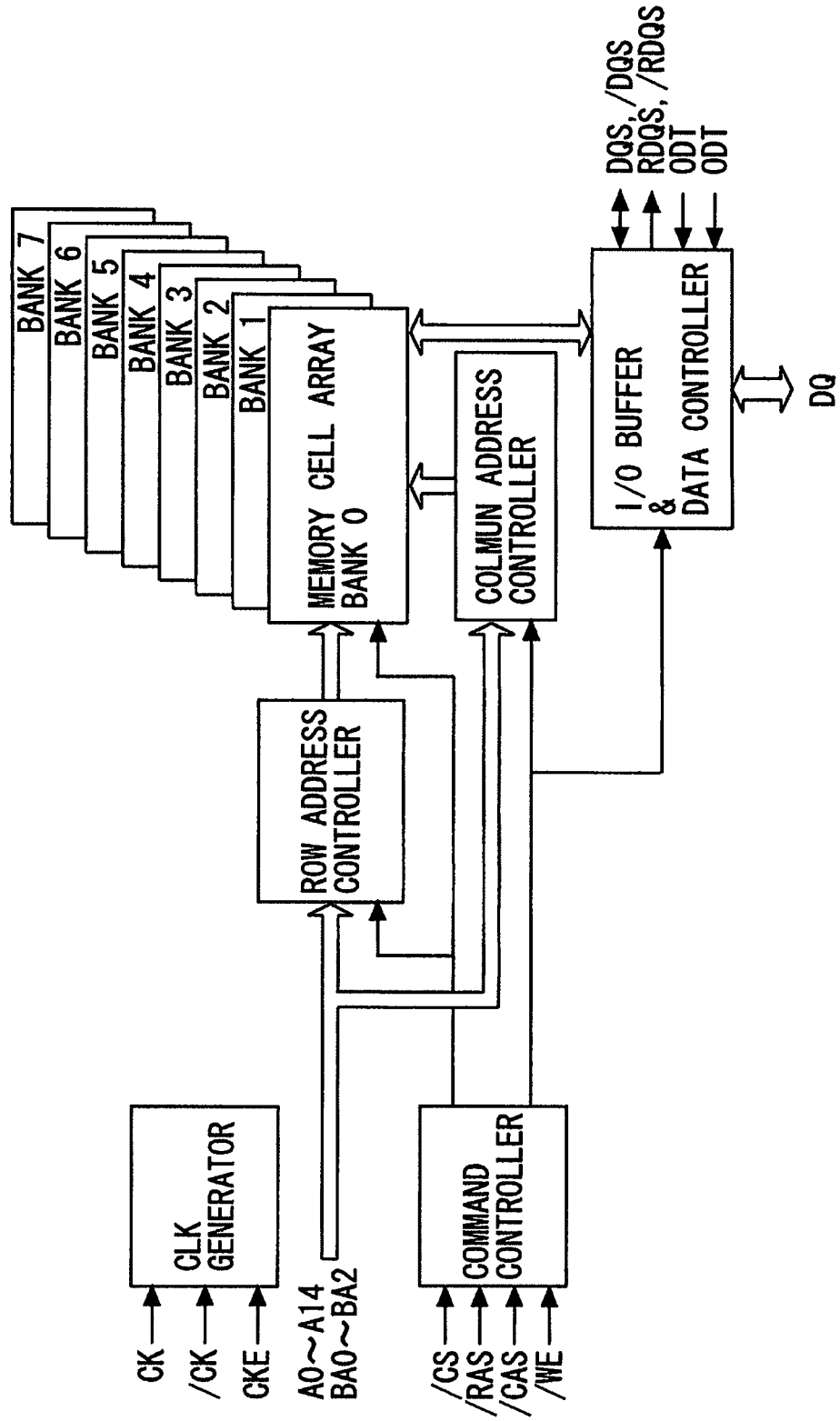
FIG. 5 is an explanatory diagram of SDRAMs

FIG. 5 shows a diagram of the SDRAMs 31 mounted on the DIMM. The selection and the operation of the SDRAMs 31 are determined by command signals (/RAS, /CAS, /WE) and /CS given through connections from the memory controllers 2.

A0-A14 and BA0-BA2 represent signals of which connections are established for selecting the addresses, wherein the signals BA0-BA2 select one of totally eight pieces of memory banks, and the signals A0-A14 are used for selecting storage cells within the bank.

The selection of the storage cells involves using two address such as a row address and a column address when executing time-division of the signals A0-A14. The data in the storage cells are inputted and outputted as carried on four lines of data signals (DQ). The DQ signals are latched by a data strobe signal pair (DQS, /DQS).

The EEPROM 32 mounted on the DIMM 3 is stored with command timing and architecture information about the ranks etc. An I2C access control circuit 23 of the memory controller 2 reads the information in accordance with serial standards called "I2C", and performs initialization for controlling the DIMM 3 according to the firmware.

The SDRAM 31 has a memory refreshing function for retaining the storage. The memory refreshing is, in the same way as by the memory read and the memory write, conducted based on a command given from the memory controller 2.

The buses each using the DDR2 interface extend between the memory controllers 2 and the SDRAMs 31. Dot connections via the busses are established base don slots and the ranks.

The system controller 1 converts a physical address given from the CPU into the memory address, and sends the memory address together with the read/write command to each of the memory controllers 2. When writing to the memory, the write data is sent to the memory controller 2.

The memory address is organized by a chip selection signal (CS[3:0]) for selecting the rank defined as a group of the SDRAMs on the memory interface, a bank address (BA) 2:0]) for selecting the bank of the SDRAMs, a row address for selecting a storage cell group in the bank, and a column address for selecting a data bit from the storage cell group selected by the row address.

The memory controller 2, with the I2C access control circuit 23 referring to the EEPROM 32 when operating for the initialization, is thereby capable of knowing specifications such as the memory architecture of the mounted DIMM and the command timing.

An example of the initializing operation in the present embodiment will be explained with reference to FIG. 3. After the information processing system 10 has been powered ON, the firmware is started up, and the information is read from the EEPROM 32 of the DIMM 3. An architecture register in the memory controller 2 is set based on the readout information. For example, a memory map, operation timing and the number of ranks (rank count) are determined based on DIMM on-board information. Further, the initialization of the DIMM 3 itself, setup of a setting register for the DIMM 3 and setting of a resistance value of the ODT (On Die Termination) 34 are made based on the architecture information.

In the present embodiment, the control unit 21 has a register set for the added ranks 2, 3, and, when the rank count referred to is "4", initializes the ranks 2, 3 by use of this register set as well as initializing the ranks 0, 1 as usual.

Figures 7, 8:
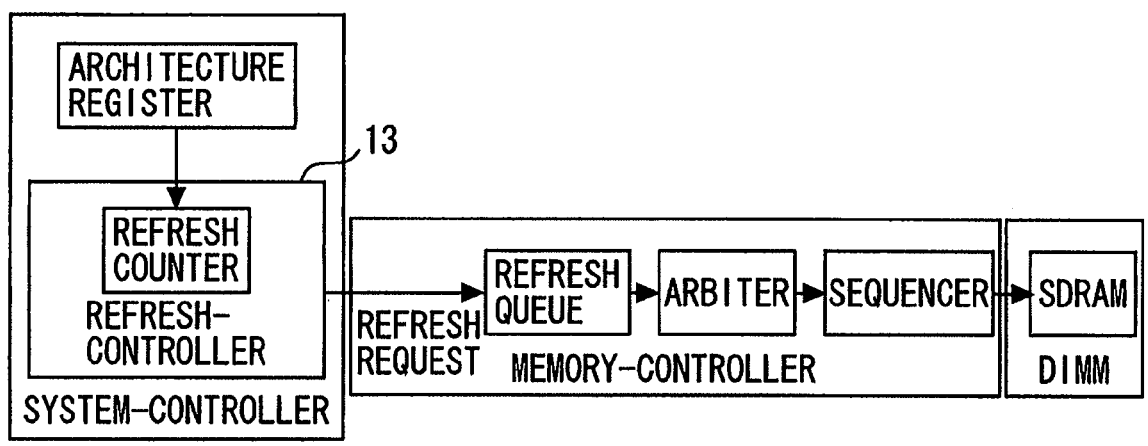
FIG. 7 is a table of truth value for rank selection.
FIG. 8 is an explanatory diagram of a memory refreshing process.

Further, an example of the memory refreshing in the information processing system 10 is illustrated in FIG. 8. Through the initializing operation described above, a refreshing interval is set in the architecture register within the system controller. This refreshing interval value is determined based on a total rank count of the DIMM 3 mounted on the memory controller 2. When a value of a refreshing counter in the system controller 1 reaches the set refreshing interval, a refreshing command is issued to the DIMM 3 via the memory controller 2. The refreshing command is issued on a rank-by-rank basis, and a target address is automatically determined within the DIMM.

Then, when the memory controller 2 receives the read/write command from the system controller 1, the data are read from and written to the DIMM 3 by a sequencer of the memory controller 2 and then transmitted and received.

§3. Explanations of Characteristic Components of Memory Controller 2 and DIMM 3

Figure 6:
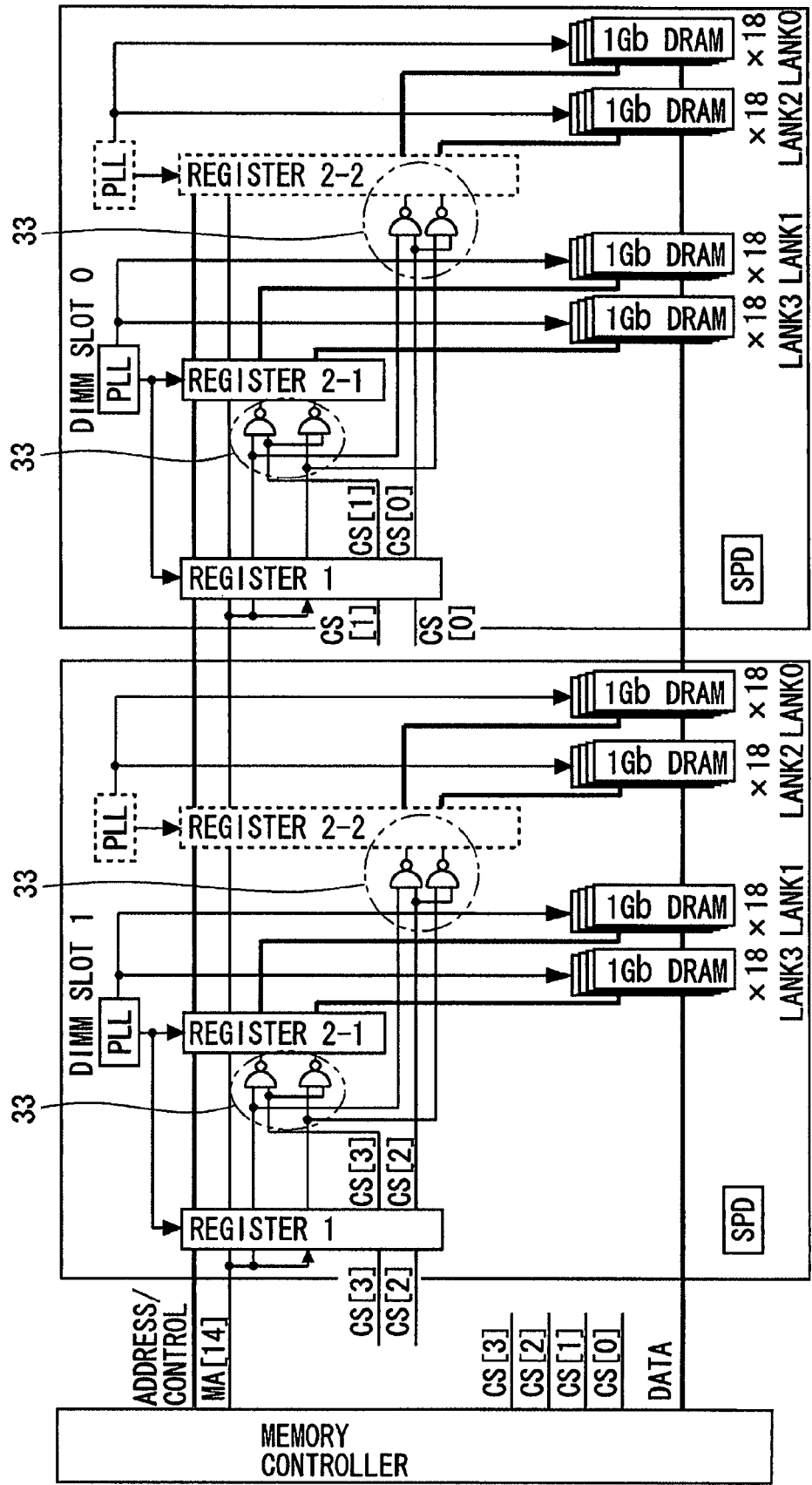
FIG. 6 is an explanatory diagram of a decoding unit.

The DIMM 3 in the present embodiment includes the decoder circuits 33 as shown in FIG. 6 because of using the single highest-order address signal line (A14) for generating the chip selection signal among the 15 address signal lines A0-A14.

The decoder circuit 33 generates the chip selection signals taking four statuses shown in a table of truth value in FIG. 7 on the basis of the signal coming from the address signal line A14 and the selection signals coming from the two existing chip selection signal lines.

Namely, the rank 0 is selected when the signal from the address signal line A14 is not asserted while the chip selection signal CS0 is asserted, and the rank 1 is selected when the chip selection signal CS1 is asserted. Further, the rank 2 is selected when the signal from the address signal line A14 is asserted and when the chip selection signal CS0 is also asserted, and the rank 3 is selected when the chip selection signal CS1 is asserted.

The address signal line A14 used herein is an existing signal line for transmitting the address signal showing the most significant bit (MSB) of the address inputted to the DIMM 3, and hence neither an increment nor a decrement of the signal occurs on the transmission path between the memory controller 2 and the DIMM 3, resulting in no necessity of redeveloping the board.

The SDRAM groups each having 1 GB are mounted on the DIMM 3 in the present embodiment, and, because of employing only the address signals A0-A13, none of problems occur in the system even when the signal line A14 showing the most significant bit is used for the chip selection.

Figure 9:
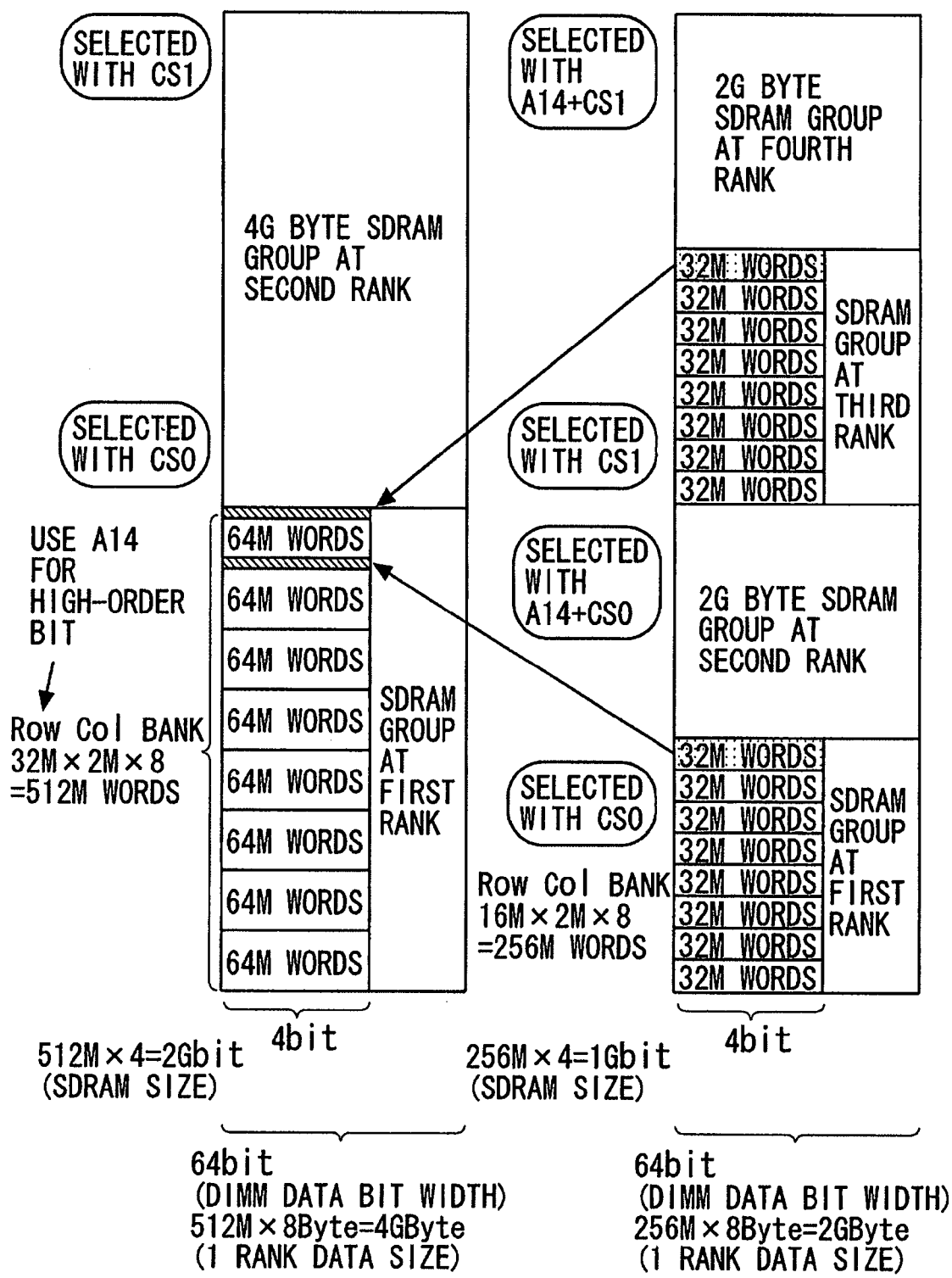
FIG. 9 is a diagram illustrating memory spatial images.

FIG. 9 illustrates the DIMM 3 and also shows a comparison between memory spatial images specified by the DDR2 interface. A spatial image 41 is specified by the DDR2 interface and takes a 2-rank memory architecture mounted with 2 GB SDRAMs, whereby the 8 GB capacity at the maximum is acquired.

By contrast, the DIMM 3 in the present embodiment obtains the 8 GB capacity by taking the 4-rank memory architecture mounted with the 1 GB SDRAMs. Therefore, the designations of the row addresses involve using A0-A13, and the designations of the column addresses involve employing A0-A9 and A11, while A14 is not used.

Accordingly, the control unit 21 of the memory controller 2, when receiving the read/write command with respect to the DIMM 3 from the system controller 1, asserts the signals to A14, CS0, CS1 as specified in the table of truth value, corresponding to the rank to be selected.

It is to be noted that the control unit 21 asserts, based on the information read from the EEPROM 32 at the initializing time, the signals for the rank selection by use of A14, CS0, CS1 if the memory module to be accessed takes the 4-rank memory architecture in the present embodiment, and asserts the signals for the rank selection by employing CS0, CS1 as specified if taking the 2-rank memory architecture, wherein A14 is employed as the address signal line.

With this scheme, the system board in the present embodiment enables utilization of the 4-rank DIMM 3 mounted with the 1 GB SDRAMs while keeping compatibility with the 2-rank DIMM mounted with the 2 GB SDRAMs based on the DDR2 interface.

Figure 10A:
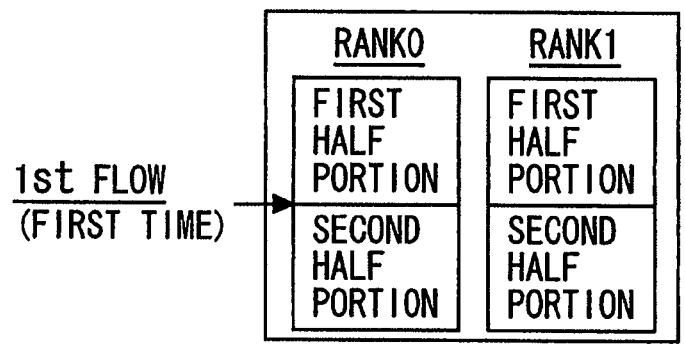
FIGS. 10 A-B are explanatory diagrams of the memory refreshing process.
Figure 10B:
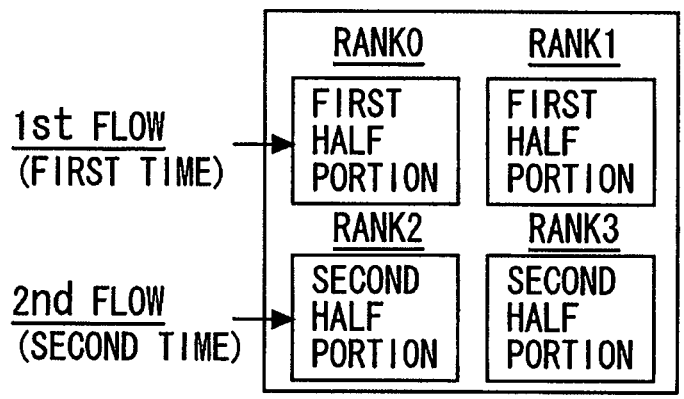

It should be noted that the present embodiment has the larger number of ranks (increased rank count) than in the existing 2-rank memory architecture, and therefore a flow of the memory fresh to the ranks 0, 1 as shown in FIG. 10A is changed into two flows (2 Flow) as illustrated in FIG. 10B.

The control unit 21 in the memory controller 2 has the sequencers corresponding to the increased rank count, and, when receiving the refreshing command to the DIMM 3 with the increased rank count, gets the memory refreshing of each rank conducted in a way that increases the memory refreshing process by the rank count.

Figure 11:
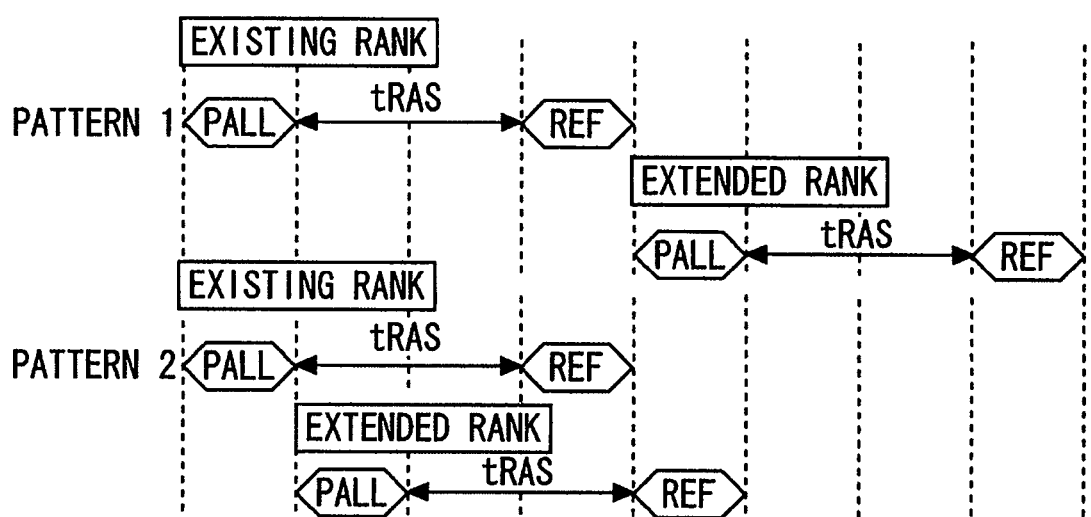
FIG. 11 is an explanatory diagram of the memory refreshing process.

For example, as in a pattern 1 shown in FIG. 11, after executing a flow 1 of processing from PALL through a wait (the predetermined period of standby time) of tRAS to REF with respect to the ranks 0, 1, the similar flow 2 is executed with respect to the ranks 2, 3. In this case, however, the time expended for refreshing the memory increases simply corresponding to the rank count, and there is a possibility of oppressing the access for reading/writing.

It is therefore desirable that as in a pattern 2, after executing PALL in the flow 1 with respect to the ranks 0, 1, PALL in the flow 2 about the ranks 2, 3 is implemented, and the memory refreshing process is carried out in parallel.

Moreover, as in the present embodiment, in the case of increasing the rank count, a rise in the number of stubs is considered, however, the control unit 21 ON/OFF-controls the ODT at the predetermined rank in accordance with the rank count, whereby the rise in the number of stubs can be restrained. Further, the ON/OFF control of this ODT may also be done corresponding to a type of the command of the read/rite etc. At this time, it may be judged from the content of the EEPROM 32 which rank the ODT is switched ON at and which rank the ODT is switched OFF at, or this judging process may be preset in the firmware.

Figure 12:
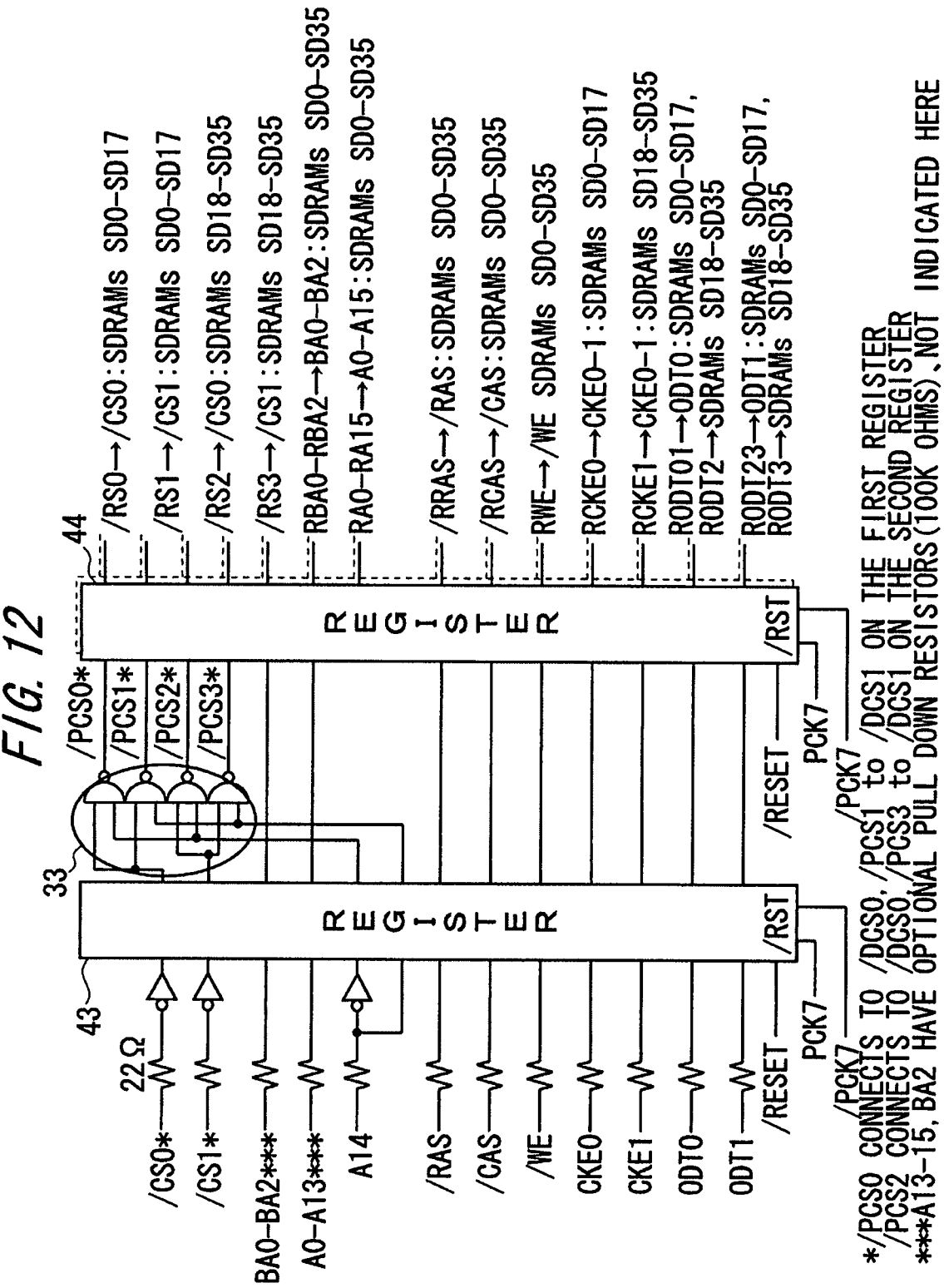
FIG. 12 is an explanatory diagram of a decoder circuit.

Moreover, it is considered that the number of circuit stages rises due to the decoder circuits 33 of the extended ranks and deterioration of transmission characteristics hinders an increase (speedup) in transmission speed, however, the present embodiment improves the transmission characteristics by interposing the decoder circuit 33 between registers as shown in FIG. 12.

Thus, the decoder circuit 33 is disposed just posterior to a register 43 while a register 44 is disposed just posterior to the decoder circuit 33, and the signal timings are well adjusted just anterior and also just posterior to the decoder circuit 33, whereby the deterioration of the transmission characteristics can be prevented.

Further, the DIMM 3 has a possibility in which the number of bus fights rises due to the increased rank count.

Figure 13:
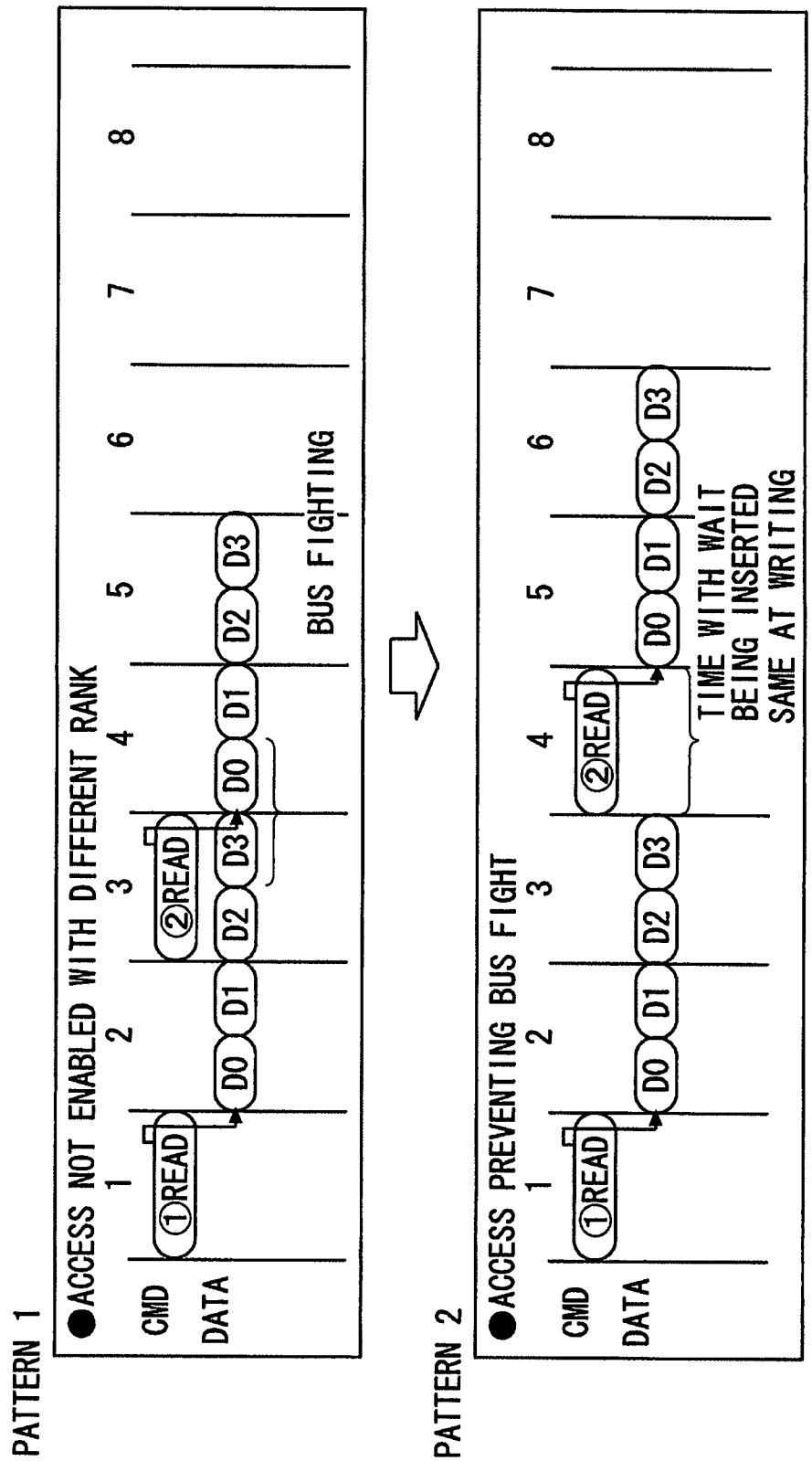
FIG. 13 is an explanatory diagram of preventing a bus fight.

The control unit 21 of the memory controller 2, if there is no access interruption between the first half portion and the second half portion within the same rank, as in the pattern 1 shown in FIG. 13, consecutively performs accessing. If the accesses to the different ranks get consecutive, however, as in the pattern 2 illustrated in FIG. 13, the wait is inserted between the accesses.

Namely, the control unit 21 exclusively manages the accesses to the respective ranks including the extended ranks 2, 3, and the wait is inserted between the accesses to the different ranks.

As described above, in the present embodiment, the signal for the rank selection is transmitted by use of the existing signal line, and hence the conventional interface can be employed even when increasing the rank count.

Accordingly, even if the increase in capacity of the SDRAMs is not desired, the capacity of the DIMM can be augmented by increasing the rank count. For example, the high-capacity DIMM can be attained by the 1 GB SDRAMs without employing the 2 GB SDRAMs that are not so easy to obtain at the present. Therefore, the wide-spread inexpensive SDRAMs are selectable, and the high-capacity DIMM can be easily manufactured at a low cost.

Further, it is possible to control the initialization and the refreshing of the increased ranks.

The address itself transferred to the DIMM can be employed as it is, and therefore the capacity of the DIMM can be increased without adding any change to the control of the physical address given from the CPU.

Moreover, the total capacity of the memories can be augmented without increasing the number of the DIMMs mounted in the information processing system, so that the cost for developing the system can be reduced.

<Incorporated by Reference>

The disclosures of Japanese patent application No. JP2006-223567 filed on Aug. 18, 2006 including the specification, drawings and abstract are incorporated herein by reference.

What is claimed is:

1. A memory control device accessible to a memory module including a plurality of memory devices arranged in a plurality of ranks, the memory control device comprising:
   a control unit that switches a usage of address lines and chip selection signal lines, when selecting one rank of the memory devices, whether the selecting is to be executed by using a combination of a part of address lines and all chip selection signal lines, or by using the all chip selection signal lines without using the combination of the part of address lines and the all chip selection signal lines, the control unit executing the switching on the basis of architecture information of the memory module read out from a storing unit included in the memory module.

2. The memory control device according to claim 1, wherein
   each of the memory devices is a rank of SDRAM (Synchronous Dynamic Random Access Memory).

3. A memory control device accessible to a memory module including a plurality of ranks, the memory control device comprising:
   a control unit that
       designates one of the plurality of ranks by using a combination of a part of address lines and two chip selection signal lines when the control unit detects that the memory module includes four ranks on the basis of architecture information of the memory module read out from a storing unit included in the memory module, and
       designates one of the plurality of ranks by using the two chip selection signal lines when the control unit detects that the memory module includes two ranks on the basis of the architecture information of the memory module read out from the storing unit included in the memory module.

4. An information processing device comprising:
   a memory module that includes a plurality of memory devices arranged in a plurality of ranks; and
   a memory control device that is accessible to the memory module and includes
       a control unit that switches, when selecting one rank of the memory devices, whether the selecting is to be executed by using a combination of a part of address lines and all chip selection signal lines, or by using the all chip selection signal lines without using the combination of the part of address lines and the all chip selection signal lines, the control unit executing the switching on the basis of architecture information of the memory module read out from a storing unit included in the memory module.

5. An information processing device comprising:
   a memory module including a plurality of ranks; and
   a memory control device that is accessible to the memory module and includes a control unit that
       designates one of the plurality of ranks by using a combination of a part of address lines and two chip selection signal lines when the control unit detects that the memory module includes four ranks on the basis of architecture information of the memory module read out from a storing unit included in the memory module, and designates one of the plurality of ranks by using the two chip selection signal lines when the control unit detects that the memory module includes two ranks, on the basis of the architecture information of the memory module read out from the storing unit included in the memory module.

* * * * *